US007310751B2

(12) United States Patent
Tayler et al.

(10) Patent No.: US 7,310,751 B2
(45) Date of Patent: Dec. 18, 2007

(54) TIMEOUT EVENT TRIGGER GENERATION

(75) Inventors: Michael Tayler, Loveland, CO (US);
Eric Delano, Fort Collins, CO (US)

(73) Assignee: Hewlett-Packard Development Company, L.P., Houston (JP)

( * ) Notice: Subject to any disclaimer, the term of this patent is extended or adjusted under 35 U.S.C. 154(b) by 475 days.

(21) Appl. No.: 10/783,112

(22) Filed: Feb. 20, 2004

(65) Prior Publication Data

US 2005/0188277 A1  Aug. 25, 2005

(51) Int. Cl.
*G06F 11/00* (2006.01)
(52) U.S. Cl. ...................................... 714/55
(58) Field of Classification Search ............. 714/55
See application file for complete search history.

(56) References Cited

U.S. PATENT DOCUMENTS

| 5,012,435 A * | 4/1991 | Bailey et al. ............. 714/55 |
| 5,287,362 A * | 2/1994 | Liencres ................. 714/55 |
| 5,297,275 A | 3/1994 | Thayer |
| 5,408,645 A * | 4/1995 | Ikeda et al. ............. 714/55 |
| 5,651,113 A * | 7/1997 | Lin et al. ............... 714/56 |
| 5,978,939 A | 11/1999 | Mizoguchi et al. |
| 5,983,330 A * | 11/1999 | Miwa et al. ............ 711/167 |
| 6,112,320 A * | 8/2000 | Dien .................... 714/51 |
| 6,145,103 A * | 11/2000 | Typaldos et al. ......... 714/55 |
| 6,247,138 B1 * | 6/2001 | Tamura et al. ........... 713/600 |
| 6,260,162 B1 * | 7/2001 | Typaldos et al. ......... 714/55 |
| 6,311,295 B1 * | 10/2001 | Casal et al. ............. 714/55 |
| 6,378,083 B1 * | 4/2002 | Yamanaka et al. ....... 713/601 |
| 6,405,328 B1 * | 6/2002 | Vasanoja ................ 714/55 |
| 2004/0237006 A1 * | 11/2004 | Adkisson et al. ........ 714/55 |

FOREIGN PATENT DOCUMENTS

| DE | 2946081 A1 | 5/1981 |
| JP | 60019318 A | 7/1983 |
| JP | 61224537 A | 3/1985 |
| JP | 2000090063 | 9/1998 |
| JP | 2002229866 | 1/2001 |

* cited by examiner

*Primary Examiner*—Robert W. Beausoliel
*Assistant Examiner*—Elmira Mehrmanesh

(57) ABSTRACT

A system is disclosed for generating a plurality of timeout event triggers in response to a plurality of kinds of timeout events. The system includes an overflow generator, which generates a plurality of overflow signals having a plurality of periods. The system also includes a plurality of trigger generators corresponding to the plurality of kinds of timeout events. Each of the plurality of trigger generators is associated with a corresponding timeout threshold value representing the minimum amount of time that must elapse for the trigger generator to generate a timeout event trigger. For each of the plurality of timeout triggers, a corresponding selection signal selects one of the plurality of periodic overflow signals. The timeout threshold corresponding to each timeout trigger is equal to the period of the corresponding selected overflow signal multiplied by the value of the corresponding control signal.

33 Claims, 10 Drawing Sheets

TIMEOUT EVENT TRIGGER GENERATION

BACKGROUND

1. Field of the Invention

The present invention relates to techniques for generating timeout event triggers and, more particularly, to techniques for generating multiple timeout event triggers in response to multiple timeout events.

2. Related Art

In the context of electronic circuitry, the term "timeout event" refers to the failure of a circuit component to perform a task within a particular period of time. One example of a timeout event is the failure of a microprocessor to generate a response to a message received from another microprocessor. Circuits typically include watchdog timers to identify the occurrence of timeout events and to generate timeout signals (also referred to as "timeout event trigger signals" or simply as "triggers") in response to such events and thereby to signal their occurrence to other circuit components. Timeout event triggers may be provided to a processor or other circuitry so that such circuitry may take appropriate action in response to the timeout event. For example, in response to a timeout event trigger generated by a particular circuit component, a reset signal may be transmitted to the component in an attempt to reset the component and thereby to bring it back into a normal mode of operation. In any particular circuit, there may be a variety of timeout events of varying durations that need to be identified and for which timeout event triggers need to be generated.

Referring to FIG. 1, a schematic diagram is shown of a prior art system 100 including a plurality of circuits 102a-d coupled to a plurality of watchdog timers 104a-d. Both circuits 102a-d and watchdog timers 104a-d are clocked by a common clock 106, which outputs a clock signal on line 120.

Watchdog timer 104a receives the clock signal on line 120 at clock input 110a. Watchdog timer 104a includes a count register 112a that is incremented at each clock cycle. The watchdog timer 104a also includes a control register 114a that contains a timeout threshold value. The watchdog timer 104a also includes a comparator 116a, which compares the contents of the count register 112a and the control register 114a and determines whether they are equal to each other. The comparator 116a asserts a timeout trigger signal on line 118a when the values of the count register 112a and the control register 114a are equal to each other.

During normal operation of circuit 102a, circuit 102a periodically transmits a reset signal to reset input 108a of watchdog timer 104a, thereby causing the value of the count register 112a to be reset. In particular, if thresh is the value of the control register 114a, the circuit 102a should generate a reset signal with a period that is less than thresh during normal operation. The assertion of the trigger signal on line 118a by the watchdog timer 104a therefore indicates that the circuit 102a has not generated a reset signal in at least thresh clock cycles, and that a timeout event therefore has occurred in circuit 102a.

Watchdog timers 104b-d similarly include reset inputs 108b-d, clock inputs 110b-d, count registers 112a-d, control registers 114a-d, and comparators 116b-d, and similarly generate triggers on lines 118b-d.

Let t be the number of distinct triggers capable of being generated by the system 100. In the example illustrated in FIG. 1, t=4. Let n be the maximum number of bits required to represent the timeout threshold value stored in any of the control registers 114a-d. For example, if each of the control registers 114a-d is required to store a timeout threshold value (thresh) up to 32000, then n=15, because 15 bits are required to represent values ranging from 0-32000. The size of system 100 scales linearly with the values of t and n. In particular, the widths of the count registers 112a-d, control registers 114a-d, comparators 116a-d, and trigger signals 118a-d increase as the value of n increases, and the number of watchdog timers increases as the value of t increases.

For example, in the case in which t=4 and n=15, four watchdog timers would be required, each of which would be required to include a 15-bit count register, control register, and comparator, for a total of 60 (4*15) count register bits, 60 control register bits, and 60 comparator bits.

The size and expense of such circuitry can become prohibitively large when a large number of triggers having large timeout threshold values are required. What is needed, therefore, are improved techniques for efficiently providing multiple timeout event triggers in an electronic circuit.

SUMMARY

A system is disclosed for generating a plurality of timeout event triggers in response to a plurality of kinds of timeout events. The system includes an overflow generator, which generates a plurality of overflow signals having a plurality of periods. The system also includes a plurality of trigger generators corresponding to the plurality of kinds of timeout events. Each of the plurality of trigger generators is associated with a corresponding timeout threshold value representing the minimum amount of time that must elapse for the trigger generator to generate a timeout event trigger. For each of the plurality of timeout triggers, a corresponding selection signal selects one of the plurality of periodic overflow signals. The timeout threshold corresponding to each timeout trigger is equal to the period of the corresponding selected overflow signal multiplied by the value of the corresponding control signal.

For example, in one embodiment of the present invention, a device is provided which includes an overflow generator to generate a plurality of overflow signals having a plurality of periods; a plurality of control registers storing a plurality of selection values and a plurality of control values; a first trigger generator comprising first trigger generation means for generating a first timeout event trigger signal based on the plurality of overflow signals, a first one of the plurality of selection values, and a first one of the plurality of control values; and a second trigger generator comprising second trigger generation means for generating a second timeout event trigger signal based on the plurality of overflow signals, a second one of the plurality of selection values, and a second one of the plurality of control values.

Other features and advantages of various aspects and embodiments of the present invention will become apparent from the following description and from the claims.

DETAILED DESCRIPTION

A system is disclosed for generating a plurality of timeout event triggers in response to a plurality of kinds of timeout events. The system includes an overflow generator, which generates a plurality of overflow signals having a plurality of periods. The system also includes a plurality of trigger generators corresponding to the plurality of kinds of timeout events. Each of the plurality of trigger generators is associated with a corresponding timeout threshold value representing the minimum amount of time that must elapse for the trigger generator to generate a timeout event trigger. For each of the plurality of timeout triggers, a corresponding selection signal selects one of the plurality of periodic overflow signals. The timeout threshold corresponding to each timeout trigger is equal to the period of the corresponding selected overflow signal multiplied by the value of the corresponding control signal.

Figure 2:
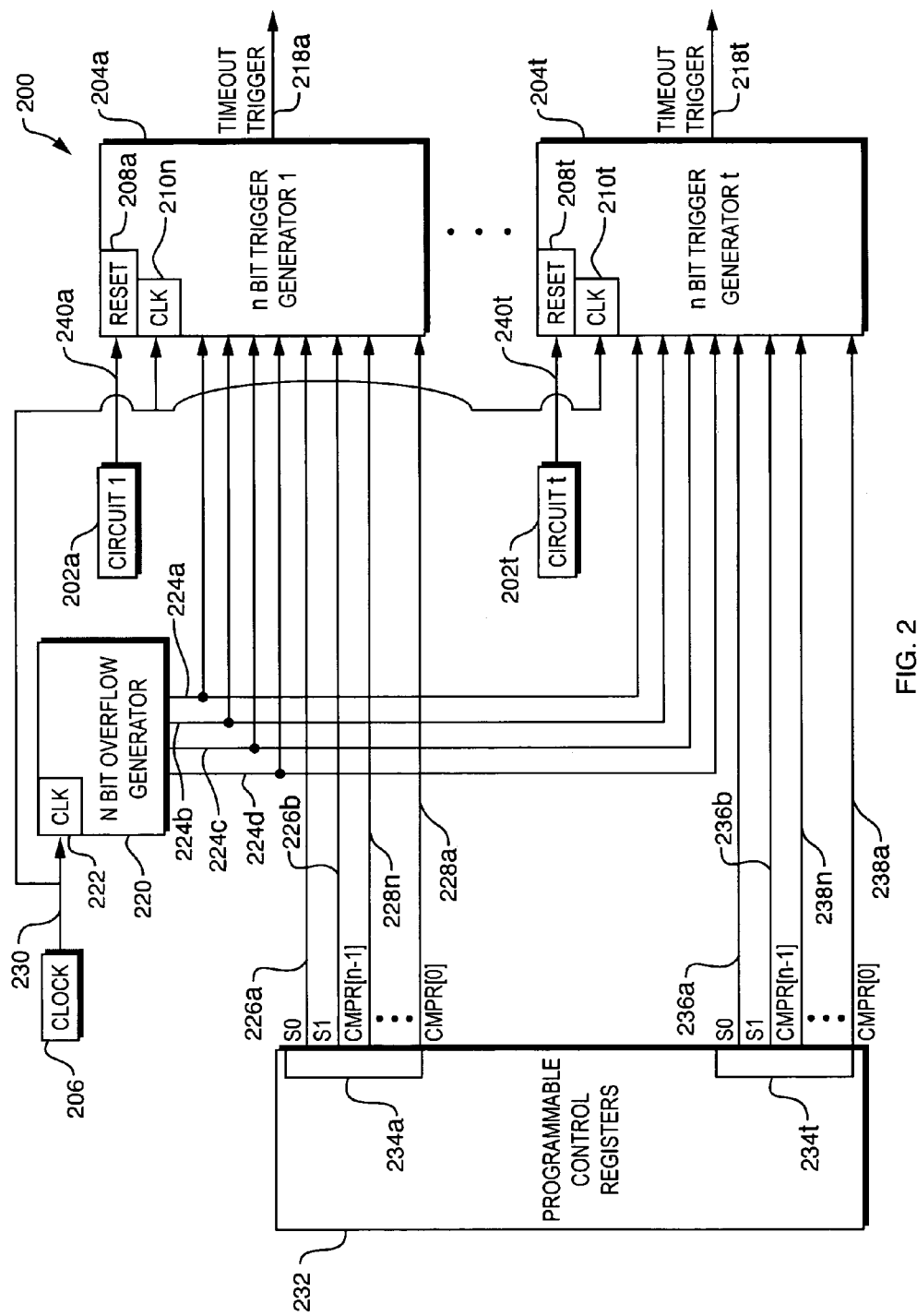
FIG. 2 is a schematic diagram of a timeout event trigger generation system according to one embodiment of the present invention.

Referring to FIG. 2, a schematic diagram is shown of a timeout event trigger generation system 200 according to one embodiment of the present invention. The system 200 includes a plurality of circuits 202a-t coupled to a plurality of trigger generators 204a-t. The circuits 202a-t may, for example, be integrated circuits such as microprocessors, synchronous memories, or I/O controllers. The system 200 also includes a central overflow generator 220, which generates and transmits overflow signals on lines 224a-d. Each of the trigger generators 204a-t receives the overflow signals on lines 224a-d. A common clock 206 generates a clock signal on line 230, which clocks the overflow generator 220 at clock input 222 and the trigger generators 204a-t at clock inputs 210a-n, respectively. The system 200 also includes a bank 232 of programmable control registers 234a-t corresponding to the plurality of trigger generators 204a-t.

Figure 3:
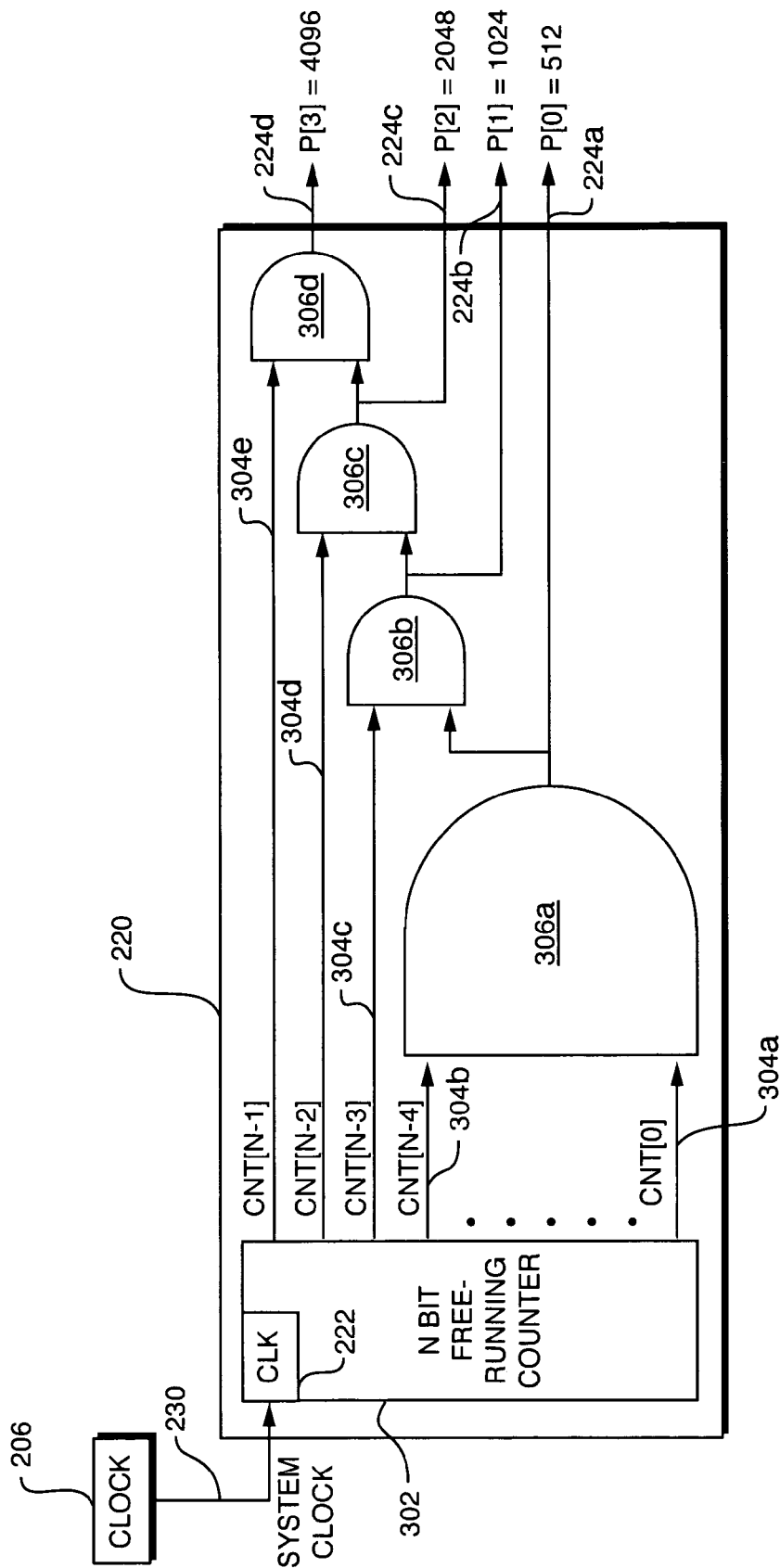
FIG. 3 is a schematic diagram of the overflow generator of FIG. 2 according to one embodiment of the present invention.

Referring to FIG. 3, a schematic diagram is shown of the overflow generator 220 according to one embodiment of the present invention. In general, overflow generator 220 produces periodic overflow signals having periods that are related to each other by factors of two.

More specifically, the overflow generator 220 includes a free running N-bit digital counter 302 that is clocked by the system clock 206 at clock input 222, where N is the number of bits in the count generated by the counter 302. Assume for purposes of example that N=12 in the following discussion. N may, however, have any value. The counter 302 produces an N-bit output signal on N output lines, only a subset of which (i.e., lines 304a-e) are illustrated in FIG. 3 for ease of illustration. Line 304a is the least significant bit and line 304e is the most significant bit of the output of the counter 302. The counter 302 increments its output at each clock cycle.

The overflow generator 220 also includes a plurality of AND gates 306a-d arranged in a cascading structure. In particular, line 304a, 304b, and all lines therebetween (not shown) are coupled to inputs of AND gate 306a. When N=12 and the overflow generator 220 includes four AND gates 306a-d as shown in FIG. 3, the least significant nine outputs of the counter 302 are coupled to inputs of AND gate 306a. The output of AND gate 306a is provided as a first overflow signal on output line 224a of the overflow generator 220.

Line 304c and the output of AND gate 306a are provided as inputs to AND gate 306b, the output of which is provided as a second overflow signal on output line 224b of the overflow generator 220. Line 304d and the output of AND gate 306b are provided as inputs to AND gate 306c, the output of which is provided as a third overflow signal on output line 224c of overflow generator 220. Finally, line 304e and the output of AND gate 306c are provided as inputs to AND gate 306d, the output of which is provided as a fourth overflow signal on output line 224d of overflow generator 220.

Although four AND gates 306a-d for providing four outputs on four output lines 224a-d are illustrated in FIG. 3, the overflow generator 220 may include any number of AND gates and any number of corresponding outputs. Those of ordinary skill in the art will appreciate how to arrange any number of AND gates in a cascading pattern and how to couple the outputs of the counter 302 to inputs of the AND gates for any value of N.

As mentioned above, the overflow signals provided by overflow generator 220 on output lines 224a-d have periods that are related to each other by factors of two. More specifically, let A be the number of AND gates in the overflow generator 220. Let O[i] be the overflow generator output signal at index i, where $0 \leq i < A$. In the example illustrated in FIG. 3, O[0] refers to the overflow signal on output line 224a, O[1] refers to the overflow signal on output line 224b, 0[2] refers to the overflow signal on output line 224c, and 0[3] refers to the overflow signal on output line 224d.

Each of the output lines 224a-d is asserted with a corresponding constant period P[i]. For example, when N=12 and A=4, output 224a (O[0]) is asserted every 512 clock cycles; therefore, P[0]=512. In the same example, output line 224b (O[1]) is asserted every 1024 clock cycles; therefore P[1]=1024. In general, each output is asserted half as frequently as the preceding output. In other words, P[i]=2P[i-1], for $0 \leq i < A$.

In general, the value of P[i] may be identified based on the values of N (the number of bits in the counter 302) and A (the number of AND gates in the overflow generator 220) using Equation 1:

$$P[i] = 2^{i+N+1-A}$$ Equation 1

Those having ordinary skill in the art will appreciate how to vary the values of N and A to produce output signals having desired periods.

Returning to the control register bank 232, each of the control registers 234a-t contains a selection value and a control value. In one embodiment of the present invention, each selection value is a 2-bit value and each control value is an n-bit value. Control register 234a outputs the first selection value as a selection signal on lines 226a (labeled S0) and 226b (labeled S1). Control register 234a outputs its control value as a control signal on lines 228a-n. Similarly, control register 234t outputs its selection value as a selection signal on lines 236a (labeled S0) and 236b (labeled S1), while control register 234t outputs its control value as a control signal on lines 238a-n. The selection and control signals output by the control registers 234a-t are transmitted to the corresponding trigger generators 204a-t. For example, control register 234a transmits the selection signal on lines 226a-b and the control signal on lines 228a-n to corresponding trigger generator 204a, while control register 234t transmits the selection signal on lines 236a-b and the control signal on lines 238a-n to corresponding trigger generator 204t.

Assume that the control registers 234a-t are numbered from zero to t. In the following discussion, C[j] refers to the control value in the jth control register, while S[j] refers to the selection value in the jth control register. For example, C[0] refers to the n-bit control value stored in control register 234a and transmitted on lines 228a-n, in which line 228a carries the least significant bit and line 228n carries the most significant bit of C[0]. Similarly, S[0] refers to the 2-bit selection value stored in control register 234a and transmitted on lines 226a-b, in which line 226a carries the least significant bit and line 226b carries the most significant bit of S[0]. Similarly, C[t] refers to the n-bit control value stored in control register 234t and transmitted on lines 238a-n, while S[t] refers to the 2-bit selection value stored in control register 234t and transmitted on lines 236a-b.

In one embodiment of the present invention, the system 200 operates as follows. Consider, for example, trigger generator 204a and the corresponding selection signal S[0] (on lines 226a-b) and control signal C[0] (on lines 228a-n). The value of the selection signal S[0] specifies a particular one of the overflow signals on lines 224a-d. Recalling that O[i] refers to the overflow line at index i, the selection signal S[j] may specify the overflow signal O[S[j]]. For example, S=0 may specify the signal on overflow line 224a, S=1 may specify the signal on overflow line 224b, and so on.

Let P[i] be the period of the overflow signal O[i]. The period of the overflow signal specified by selection value S[j] may therefore be identified by setting i=S[j] and applying Equation 1. For example, assume again that N=12 and A=4. When S[0]=0, P[S[0]]=512 according to Equation 1, indicating that the period of overflow signal O[S[0]] 224a, which is provided at output 514 when S[0]=0, is equal to 512. As another example, when S[0]=1, P[S[0]]=1024 according to Equation 1, indicating that the period of overflow signal O[S[0]] 224a is equal to 1024.

Let TG[j] be the trigger generator at index j, for 0≦j<t. Each trigger generator TG[j] has an associated timeout threshold value thresh[j]. In other words, trigger generator TG[j] generates a trigger when at least thresh[j] clock cycles have elapsed since trigger generator TG[j] was last reset.

Figure 6:
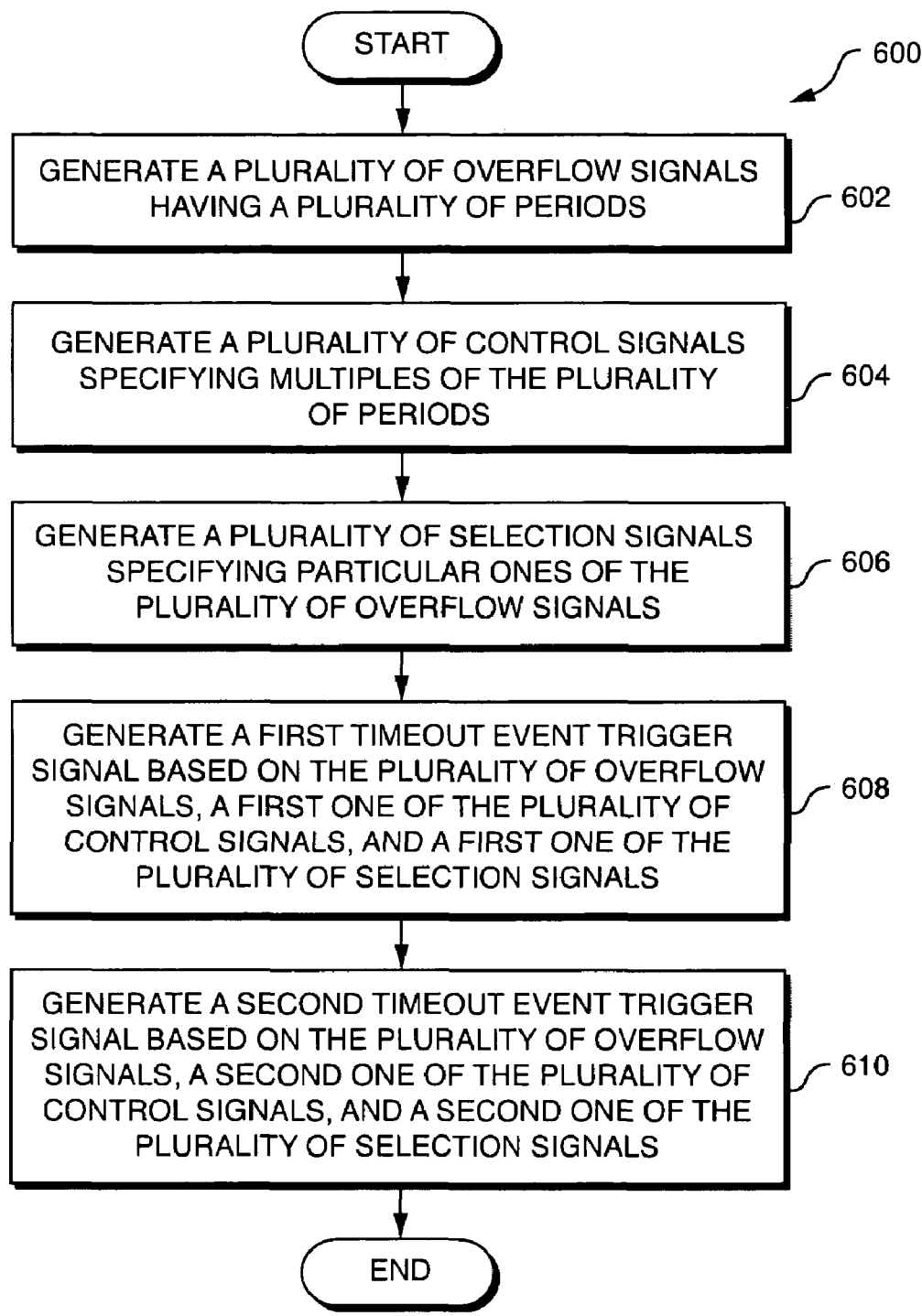
FIG. 6 is a flowchart of a method for generating a plurality of timeout event triggers according to one embodiment of the present invention.

In one embodiment of the present invention, the value of thresh[j] is at least equal to P[S[j]]C[j]. In other words, the selection value S[j] selects one of the overflow signals O[S[j]]. The minimum value of thresh[j] may be obtained by multiplying the control value C[j] by the period P[S[j]] of the selected overflow signal O[S[j]]. It may not be possible to determine the precise value of thresh[j] due to the uncertainty inherent in using the free-running counter 302 to generate the overflow signals on lines 224a-d. More generally, in one embodiment of the present invention, P[S[j]]C[j]<=thresh[j]<=P[S[j]](C[j]+1). The reason for this range of values for thresh[j] will be described below after describing the operation of the trigger generators 204a-t. The operation of the system 200 will now be described in more detail according to one embodiment of the present invention. Referring to FIG. 6, a flowchart is shown of a method 600 that is performed by the system 200 to generate a plurality of timeout event triggers according to one embodiment of the present invention. The method 600 generates a plurality of overflow signals having a plurality of periods P[i], for 0≦i<A (step 602). As described above, if the overflow generator 220 is implemented as illustrated in FIG. 3, and if N=12, the plurality of overflow signals generated on lines 224a-d have periods of P[0]=512, P[1]=1024, P[2]=2048, and P[3]=4196, respectively.

The method 600 generates a plurality of control signals specifying multiples of the plurality of periods (step 604). In the example illustrated in FIG. 2, the bank 232 of control registers 234a-t generates such a plurality of control signals, e.g., on lines 228a-n and lines 238a-n. The method 600 generates a plurality of selection signals specifying particular ones of the plurality of overflow signals (step 606). In the example illustrated in FIG. 2, the bank 232 of control registers 234a-t generates such a plurality of selection signals, e.g., on lines 226a-b and 236a-b.

The method 600 generates a first timeout event trigger signal based on the plurality of overflow signals, a first one of the plurality of control signals, and a first one of the plurality of selection signals (step 608). Consider, for example, a case in which the first control signal is the control signal C[0] on lines 228a-n and in which the first selection signal is the selection signal S[0] on lines 226a-b. This combination of control signal and selection signal are provided as inputs to trigger generator 204a (TG[0]). The overflow signals (O[0]-O[3]) on lines 224a-d are also provided as inputs to trigger generator 204a. This combination of control signal, selection signal, and overflow signals define a first trigger threshold thresh[0]. The trigger generator 204a asserts the trigger signal on line 218a if the circuit 202a has not reset the trigger generator 204a (by asserting the reset input 208a) for at least thresh[0] clock cycles.

The method 600 generates a second timeout event trigger signal based on the plurality of overflow signals, a second one of the plurality of control signals, and a second one of the plurality of selection signals (step 610). Consider, for example, a case in which the second control signal is the control signal C[t] on lines 238a-n and in which the second selection signal is the selection signal S[t] on lines 236a-b. This combination of control signal and selection signal are provided as inputs to trigger generator 204t. The overflow signals (O[0]-O[3]) on lines 224a-d are also provided as inputs to trigger generator 204t. This combination of control signal, selection signal, and overflow signals define a second trigger threshold thresh[1], the value of which may differ from that of the first trigger threshold thresh[0]. The trigger generator 204t asserts the trigger signal 218t on line 218t if the circuit 202t has not reset the trigger generator 204t (by asserting the reset input 208t) for at least thresh[1] clock cycles.

Figure 4:
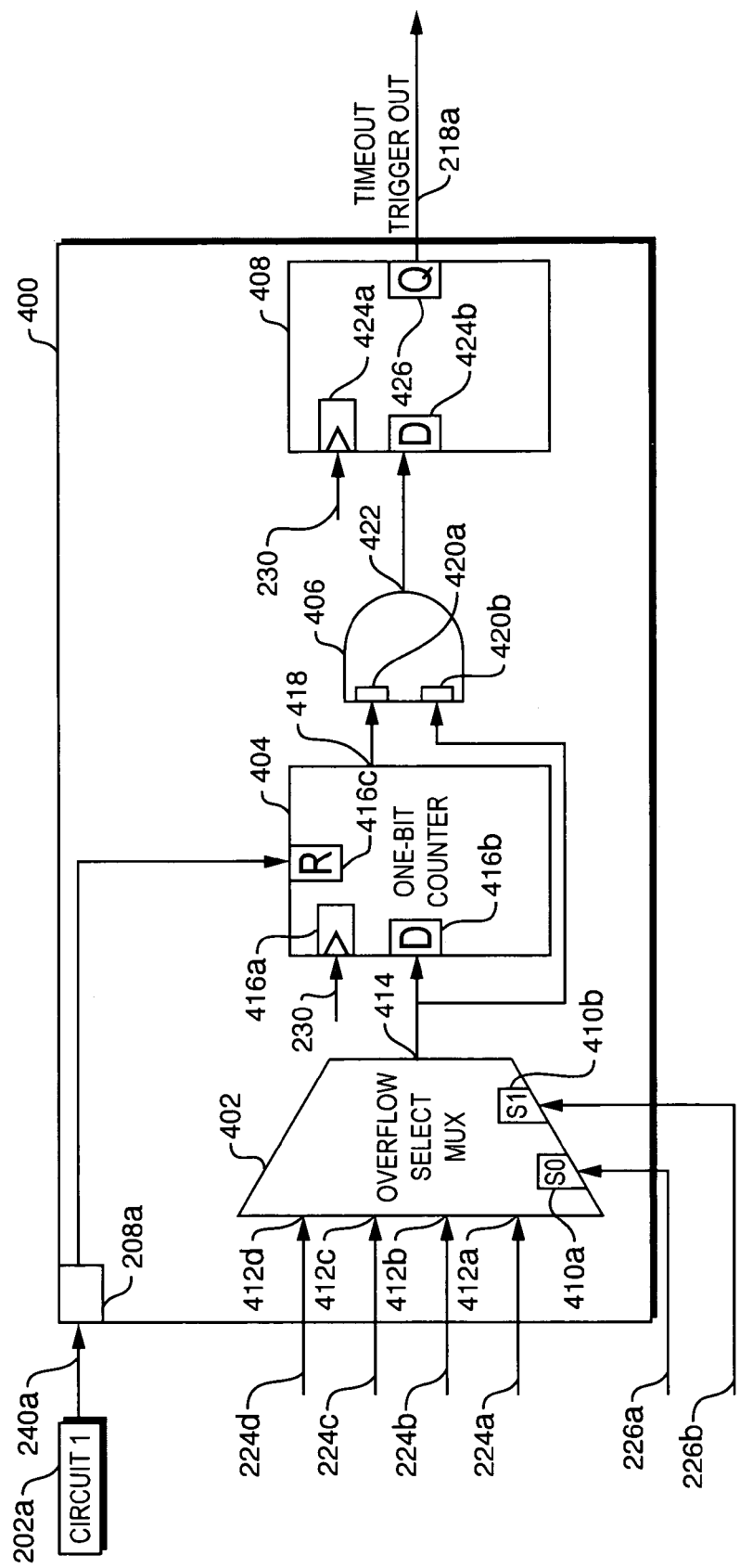
FIG. 4 is a schematic diagram of one of the trigger generators of FIG. 2 according to one embodiment of the present invention.

Referring to FIG. 4, a schematic diagram is shown of a circuit 400 that implements the trigger generator 204a (FIG.

2) according to one embodiment of the present invention. The trigger generator circuit 400 contains an overflow signal selection multiplexer 402 to select one of the overflow signals 224a-d generated by the overflow generator 220 on lines 224a-d. The selection signal S[0] on lines 226a-b are coupled to selection inputs 410a-b of the overflow signal selection multiplexer 402. Overflow selection multiplexer 402 provides the overflow signal selected by the selection signal S[0] at output 414.

The trigger generator circuit 400 also includes a one-bit counter 404. Circuit 202a is coupled to reset input 208a of trigger generator 400, which is in turn coupled to reset input 416c of one-bit counter 404. When operating normally, the circuit 202a asserts line 240a, thereby resetting output 418 of counter 404.

The one-bit counter 404 is clocked by system clock 206 at clock input 416a. Output 414 of the multiplexer 402 is coupled to data input 416b of the one-bit counter 404. Counter 404 increments its (one-bit) output 418 at each clock cycle in which its reset input 416c is not asserted and its data input 416b is asserted. The data input 416b is asserted when the multiplexer output 414 is asserted, i.e., when the overflow signal O[S[0]] selected by the selection signal S[0] on lines 410a-b is asserted. Therefore, once the counter 404 has been reset, the next assertion of overflow signal O[S[0]] causes the output 418 of the counter 404 to be asserted on the following clock cycle.

Trigger generator circuit 400 also includes an AND gate 406. Output 418 of counter 404 and output 414 of multiplexer 402 are coupled to inputs 402a-b, respectively, of AND gate 406. These inputs to the AND gate 406 will both be asserted, thereby causing the AND gate 406 to assert its output 422, only when the selected overflow signal O[S[0]] has been asserted twice since the last reset of the counter 404.

Trigger generator circuit 400 also includes a latch 408. Latch 408 is clocked by the system clock 206 at clock input 424a. Output 422 of AND gate 406 is coupled to data input 424b of latch 408. The output 422 of the AND gate 406 is thereby latched at each clock cycle and provided at output 426 of latch 408 on line 218a as a timeout event trigger signal. In the embodiment illustrated in FIG. 4, the timeout trigger on line 218a is asserted each time the second of two overflow events is detected on the selected overflow line after the trigger generator 400 has been reset.

Figure 5:
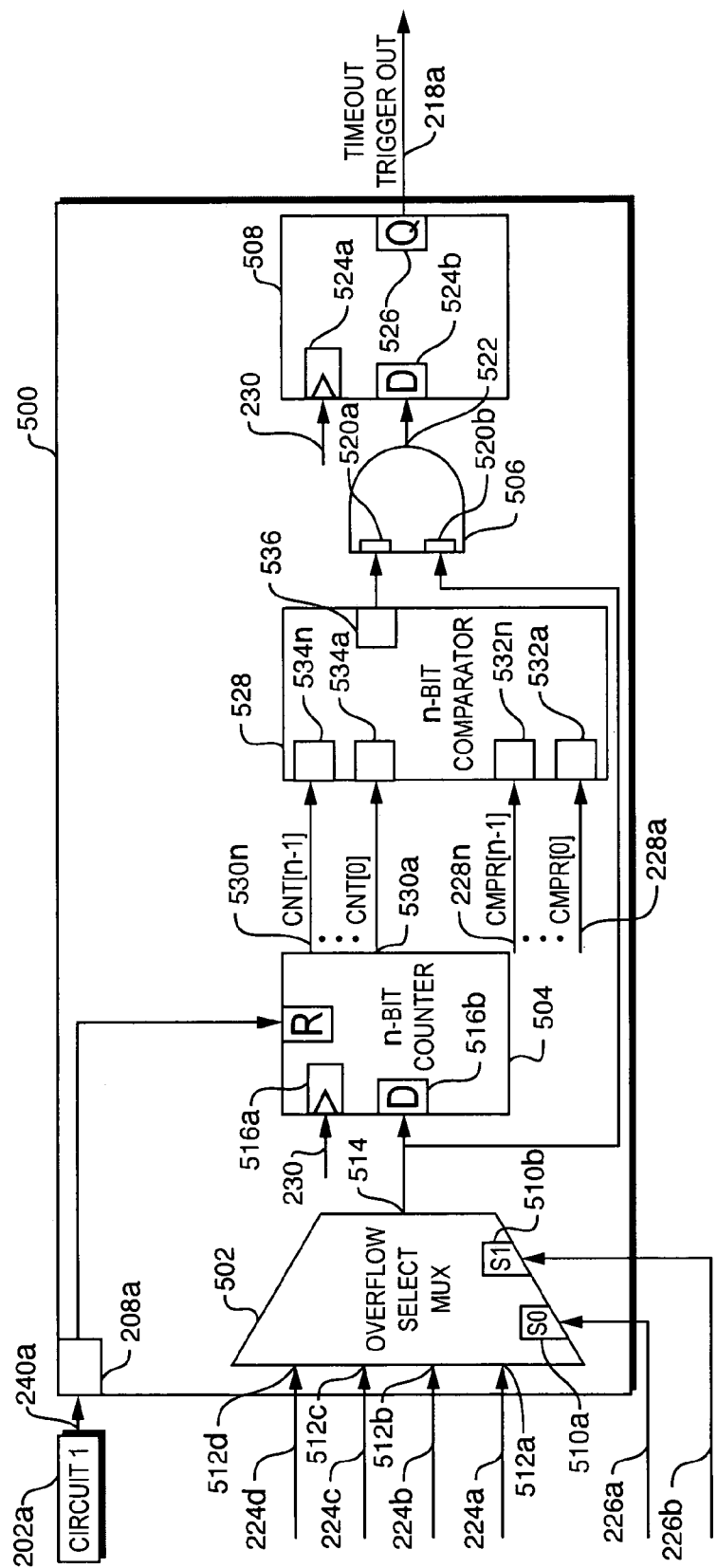
FIG. 5 is a schematic diagram of one of the trigger generators of FIG. 2 according to another embodiment of the present invention.

Referring to FIG. 5, a schematic diagram is shown of a circuit 500 that implements the trigger generator 204a according to another embodiment of the present invention. Like the circuit 400 shown in FIG. 4, the trigger generator circuit 500 contains an overflow signal selection multiplexer 502 to select one of the overflow signals 224a-d generated by the overflow generator 220. The selection signal S[0] on lines 226a-b are coupled to selection inputs 410a-b of the overflow signal selection multiplexer 502.

The trigger generator circuit 400 also includes an n-bit counter 504. Circuit 202a is coupled to reset input 208a of trigger generator 500, which is in turn coupled to reset input 516c of n-bit counter 504. When operating normally, the circuit 202a asserts line 240a, thereby resetting outputs 530a-n of counter 504.

The n-bit counter 504 is clocked by system clock 206 at clock input 516a. Output 514 of the multiplexer 502 is coupled to data input 516b of the n-bit counter 504. Counter 504 produces an n-bit count signal on lines 530a-n, in which line 530a carries the least significant bit and line 530n carries the most significant bit. Counter 504 increments its output on lines 530a-n at each clock cycle in which its reset input 516c is not asserted and its data input 516b is asserted. Therefore, after the counter 504 has been reset, the output value on lines 530a-n of the counter 504 is incremented when the output 514 of the overflow selection signal multiplexer 514 is next asserted. Therefore, the value of the count signal on lines 530a-n represents the number of overflow signals that have been asserted on the selected overflow line since the trigger generator circuit 500 was last reset.

Trigger generator circuit 500 also includes an n-bit comparator 528. Counter outputs 530a-n are coupled to first data inputs 534a-n of comparator 528. Lines 238a-n, which carry the control value C[0] output by the control register 234a (FIG. 2), are coupled to second data inputs 532a-n of the comparator 528. Comparator 528 compares its first inputs 534a-n to its second inputs 532a-n and asserts its output 536 if the two sets of inputs are equal to each other; otherwise, the comparator 528 deasserts output 536. Comparator 528 therefore asserts its output 536 when C[0] overflow events have been signaled on the selected overflow line since the counter 504 was last reset.

Trigger generator circuit 500 also includes an AND gate 506. Output 536 of comparator 528 and output 514 of multiplexer 502 are coupled to inputs 520a-b, respectively, of AND gate 506. Output 522 of AND gate 506, therefore, is only asserted when both the output 536 of the comparator 528 and the output 514 of the multiplexer 502 are asserted. As stated above, the comparator 528 asserts its output 536 after C[0] overflow events have been signaled on the selected overflow line. After C[0] such events, the multiplexer output 514 is again asserted when the next selected overflow event occurs. At such a time both the output of the comparator 528 and the output 514 of the multiplexer 502 will be asserted, thereby causing the output 536 of the AND gate 506 to be asserted. The AND gate 506 thereby asserts its output 522 when C[0]+1 overflow events have been signaled on the selected overflow line since the counter 504 was last reset.

Trigger generator circuit 500 also includes a latch 508. Latch 508 is clocked by the system clock 206 at clock input 524a. Output 522 of AND gate 506 is coupled to data input 524b of latch 508. The output 522 of the AND gate 506 is thereby latched at each clock cycle and provided at output 526 of latch 508 on line 518a as a timeout event trigger signal. In the embodiment illustrated in FIG. 5, the timeout trigger 218a is generated when (C[0]+1) overflow events have been signaled on the selected overflow line since the trigger generator circuit 500 was last reset.

Figure 7:
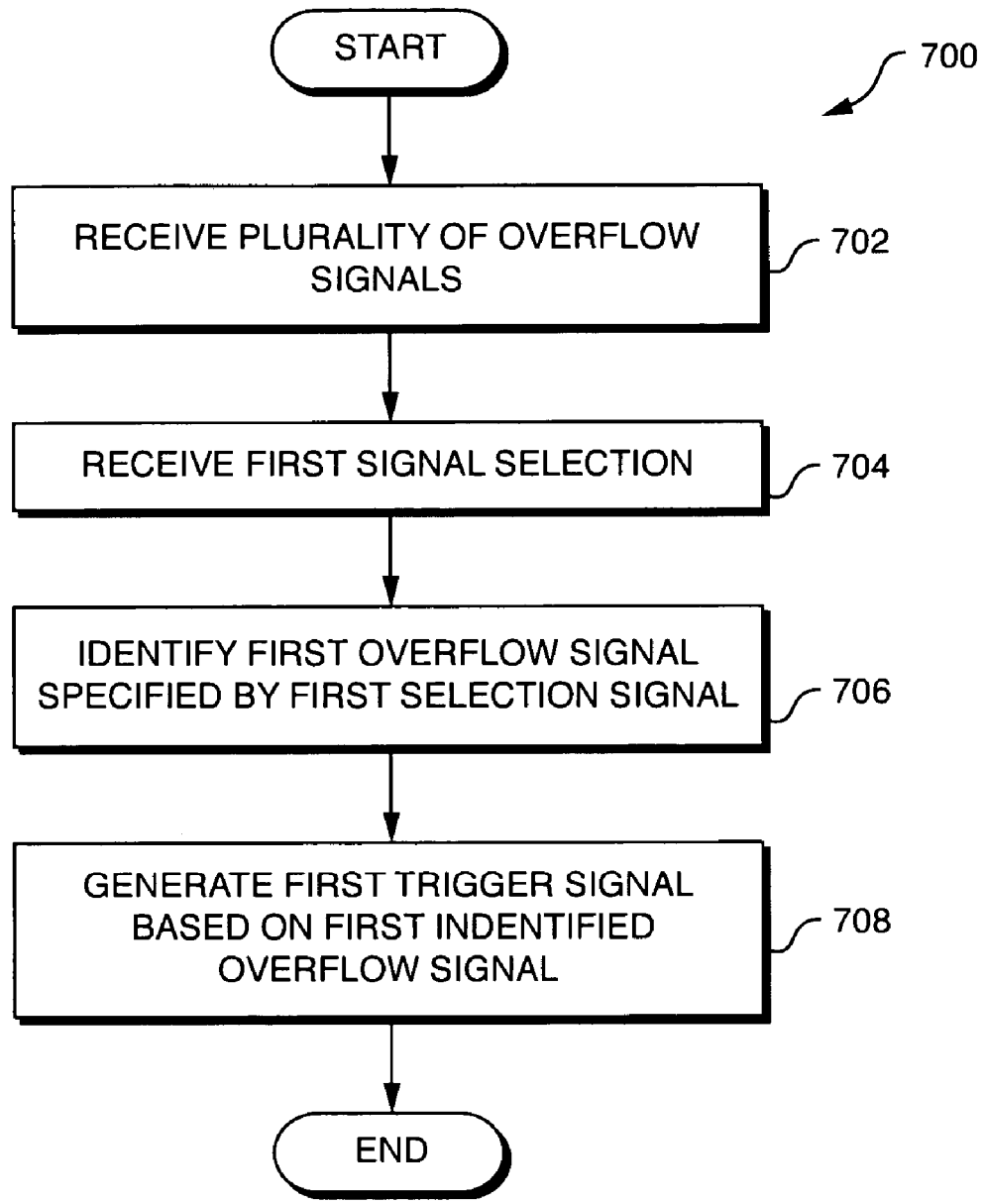
FIG. 7 is a flowchart of a method that is used by the one-bit trigger generator of FIG. 4 to generate a timeout event trigger signal according to one embodiment of the present invention.

Referring to FIG. 7, a flowchart is shown of a method 700 that is used by the one-bit trigger generator 400 (FIG. 4) to generate a first trigger signal on line 218a and thereby to implement step 608 and/or step 610 of method 600 (FIG. 6). The trigger generator 400 receives the plurality of overflow signals on lines 224a-d (step 702). The trigger generator 400 receives the first selection signal S[0] on lines 226a-b (step 704).

The trigger generator 400 identifies a first overflow signal O[S[0]] specified by the first selection signal S[0] (step 706). For example, as described above, the multiplexer 402 selects one of the plurality of overflow signals on lines 224a-d based on the first selection signal S[0] provided at selection inputs 410a-b, and provides the selected overflow signal O[S[0]] at output 414. The trigger generator 400 generates the first trigger signal on line 218a based on the overflow signal O[S[0]] identified in step 706 (step 708). Examples of techniques that may be used to perform step 708 will be described below with respect to FIGS. 9 and 10.

Figure 8:
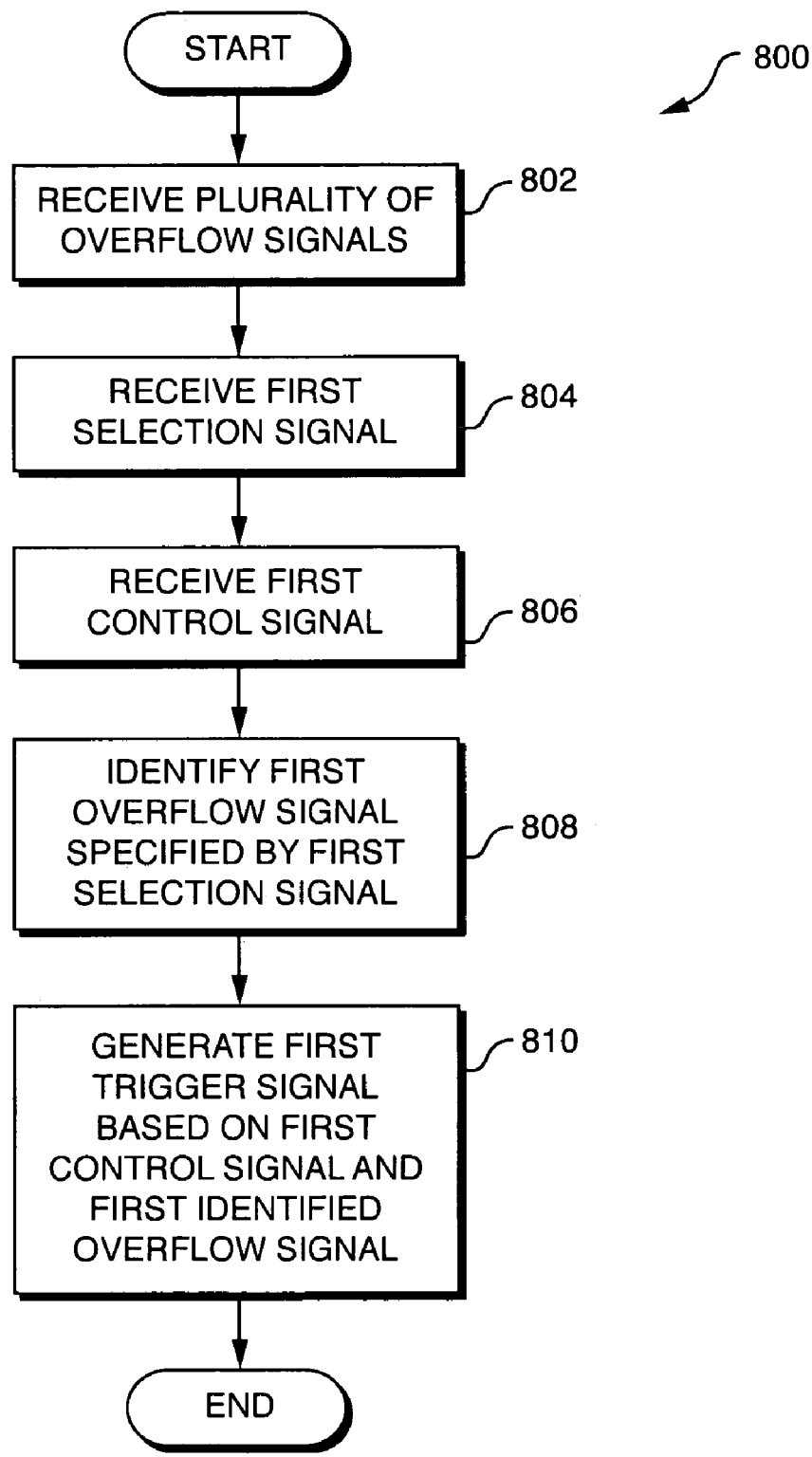
FIG. 8 is a flowchart of a method that is used by the multi-bit trigger generator of FIG. 5 to generate a timeout event trigger signal according to one embodiment of the present invention.

Referring to FIG. 8, a flowchart is shown of a method 800 that is used by the multi-bit trigger generator 500 (FIG. 5) to generate a first trigger signal on line 218a and thereby to implement step 608 of method 600 (FIG. 6). The trigger generator 500 receives the plurality of overflow signals on lines 224a-d (step 802). The trigger generator 500 receives the first selection signal S[0] on lines 226a-b (step 804). The trigger generator also receives the first control signal C[0] on lines 228a-n (step 806).

The trigger generator 500 identifies a first overflow signal O[S[0]] specified by the first selection signal (step 806). For example, as described above, the multiplexer 502 selects one of the plurality of overflow signals on lines 224a-d based on the first selection signal S[0] provided at selection inputs 510a-b, and provides the selected overflow signal O[S[0]] at output 514. The trigger generator 500 generates the first trigger signal on line 218a based on the first control signal C[0] and the overflow signal identified in step 808 (step 810). Examples of techniques that may be used to perform step 810 will now be described with respect to FIGS. 9 and 10.

Figure 9:
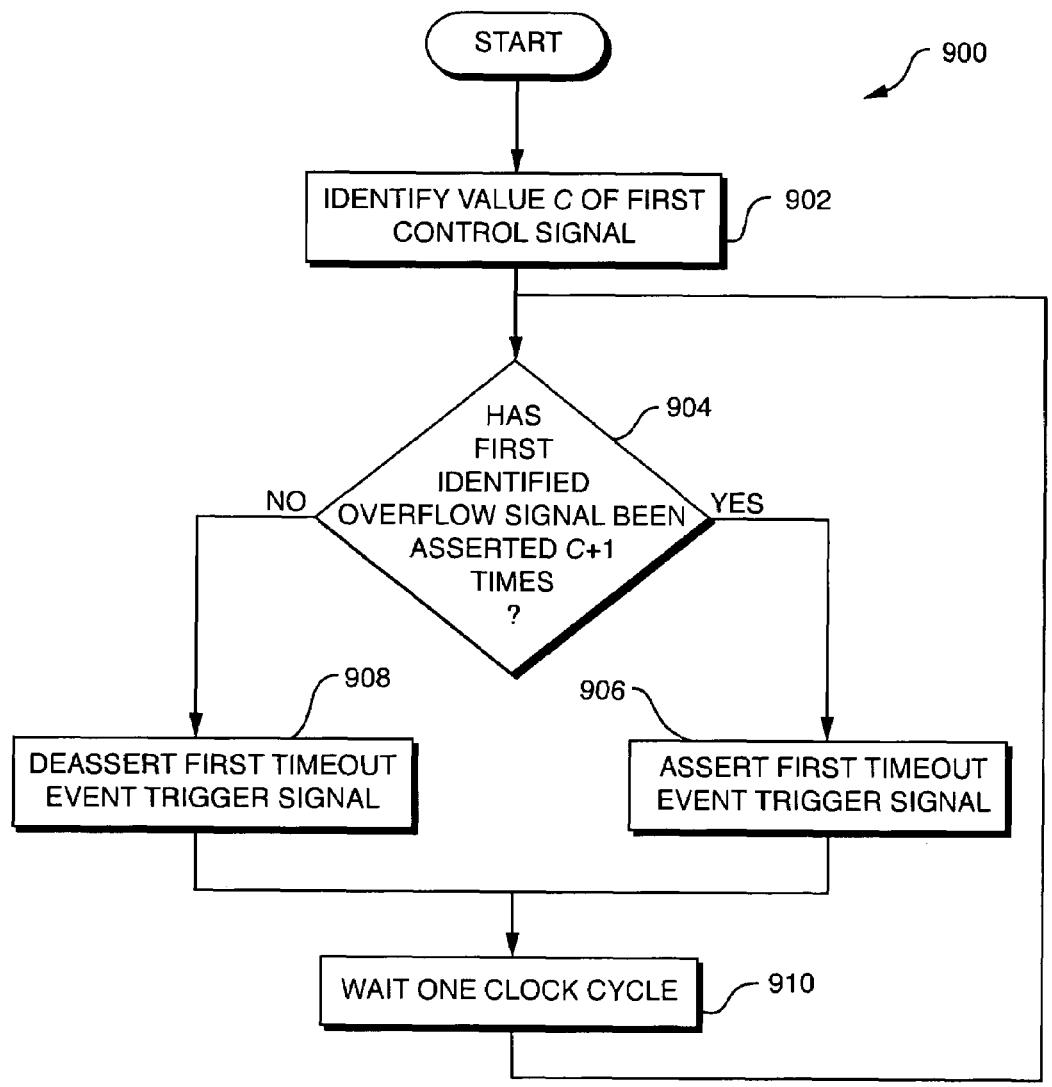
FIG. 9 is a flowchart of a first method that may be used by the one-bit trigger generator of FIG. 4 or the multi-bit trigger generator of FIG. 5 to determine whether to assert a timeout event trigger signal according to one embodiment of the present invention.

Referring to FIG. 9, a flowchart is shown of a first method 900 that may be used by the one-bit trigger generator 400 (FIG. 4) to perform step 708 of method 700 (FIG. 7) or by the multi-bit trigger generator 500 (FIG. 5) to perform step 810 of method 800 (FIG. 8). The method 900 identifies the value of the first control signal C[0] (step 902). In the case of the multi-bit trigger generator 500 (FIG. 5), the value may be identified as the value of the first control signal C[0] received on lines 228a-n. In the case of the one-bit trigger generator 400 (FIG. 4), the circuit is designed to behave as if C[0]=1, even though no control signal is explicitly provided to the circuit. Therefore, in the case of the one-bit trigger generator 400, step 902 is implicit and need not be performed explicitly.

Recall that thresh[j] may range in value from P[S[j]]C[j] to P[S[j]](C[j]+1). To understand why thresh[j] may have this range of values, consider that the N-bit overflow generator 220 asserts the selected overflow signal O[S[j]] periodically (every P[S[j]] clock cycles) independently of the times at which the counters 404 (FIG. 4) or 504 (FIG. 5) are reset. Thus, the selected overflow signal O[S[j]] may first be asserted at the trigger generator 404 or 504 in as few as zero and as many as P[S[j]] clock cycles after the trigger generator reset signal is de-asserted on line 230. The selected overflow signal O[S[j]] will next be asserted at the trigger generator 404 or 504 exactly P[S[j]] clock cycles after the first assertion of the selected overflow signal O[S[j]]. Therefore, the timeout trigger output line 218a will be asserted at least P[S[j]]C[j] clock cycles, but no more than P[S[j]]C[j]+P[S[j]] clock cycles, after the timeout trigger reset line 230 is de-asserted. Therefore, the lower limit of thresh[j] is P[S[j]]C[j], and the upper limit of thresh[j] is P[S[j]]C[j]+P[S[j]], which is equal to P[S[j]](C[j]+1).

The method 900 determines whether the first identified overflow signal O[S[0]] (identified in step 706 or 808) has been asserted at least C[0]+1 times (step 904). Step 904 may, for example, determine whether the first identified overflow signal has been asserted at least C[0]+1 times since the counter 404 or 504 was last reset. The value C[0]+1 is used because, for the reasons described above, it is only after C[0]+1 assertions of the overflow signal O[S[O]] that it can be determined with certainty that a timeout event has occurred. In other words, the method 900 determines that the value of thresh[0] is the maximum value possible (i.e., P[S[0]](C[0]+1)), to avoid incorrectly determining that a timeout event has occurred.

In the case of the one-bit trigger generator 400 (in which C[0]=1), step 904 is implemented by the one-bit counter 404 and the AND gate 406, which asserts output 422 only when the counter output 418 is asserted and the first identified overflow signal at output 414 is asserted, thereby indicating that the first identified overflow signal O[S[0]] has been asserted twice since the counter 404 was last reset. In the case of the multi-bit trigger generator 500, step 904 is implemented by the combination of the n-bit counter 504, n-bit comparator 528, and AND gate 506, which asserts output 522 only when the overflow signal at output 514 is asserted and when counter outputs 520a-n are equal to the first control signal C[0] on lines 228a-n, thereby indicating that the overflow signal at output 514 has been asserted (C[0]+1) times since the counter 504 was last reset.

If the method 900 determines that the first identified overflow signal has been asserted at least (C[0]+1) times, the method 900 asserts the first timeout event trigger signal (step 906). Otherwise, the method 900 deasserts the first timeout event trigger signal (step 908). Steps 906 and 908 are implemented by AND gate 406 in one-bit trigger generator 400 and by AND gate 506 in multi-bit trigger generator 500. The method 900 waits one clock cycle and returns to step 904 to repeat the monitoring process described above.

Figure 10:
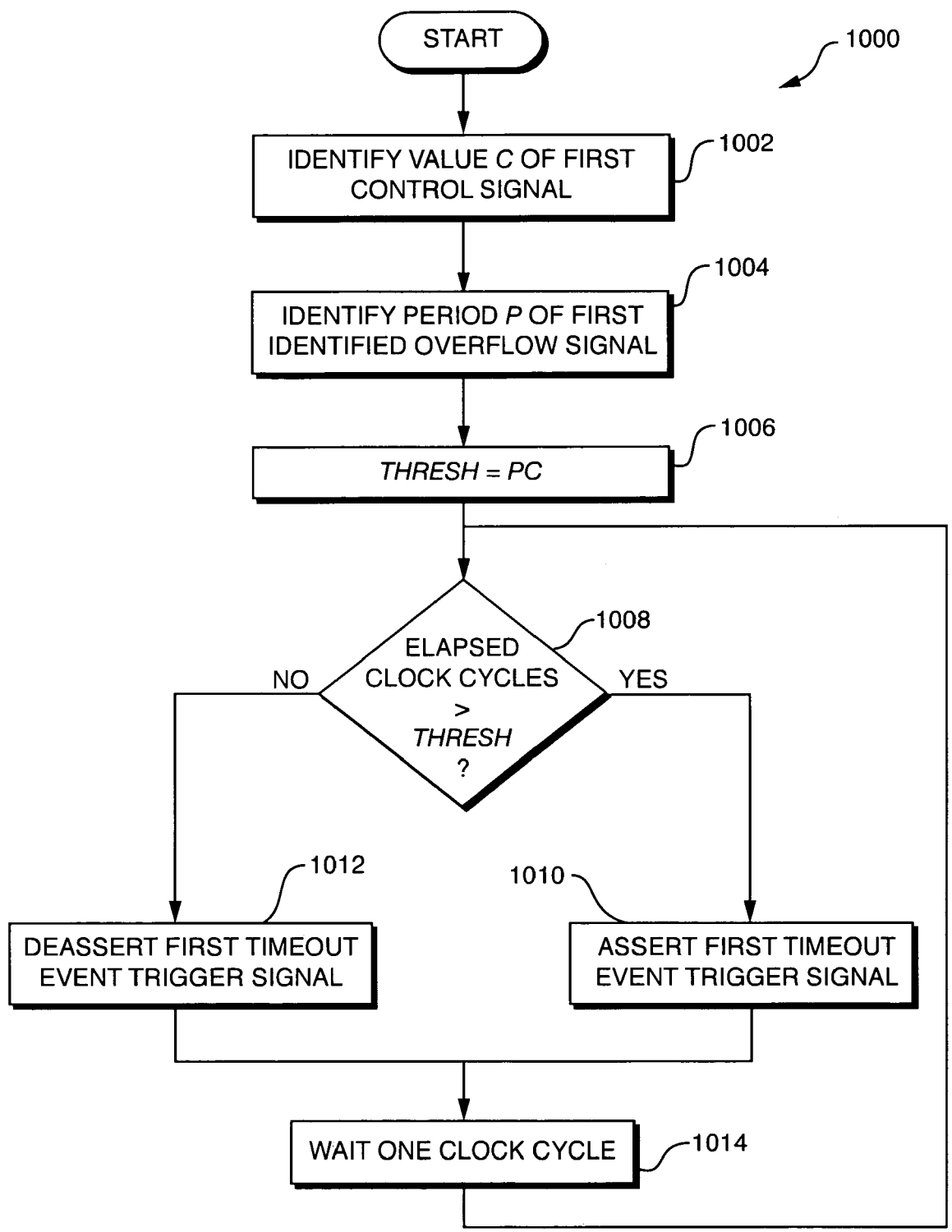
FIG. 10 is a flowchart of a second method that may be used by the one-bit trigger generator of FIG. 4 or the multi-bit trigger generator of FIG. 5 to determine whether to assert a timeout event trigger signal according to one embodiment of the present invention.

Referring to FIG. 10, a flowchart is shown of a second method 1000 that may be used by the one-bit trigger generator 400 (FIG. 4) to perform step 708 of method 700 (FIG. 7) or by the multi-bit trigger generator 500 (FIG. 5) to perform step 810 of method 800 (FIG. 8). The method 1000 identifies the value of the first control signal C[0] (step 1002) in the manner described above with respect to step 902 of method 900 (FIG. 9).

The method 1000 identifies the period P[S[0]] of the first identified overflow signal (step 1004). The method 1000 identifies P[S[O]] C[0] as the value of thresh[0] (step 1006). In other words, the method 1000 uses the first control value C[0] as a multiplier to produce a value for thresh[0] that is a multiple of the period P[S[0]] of the first identified overflow signal O[S[0]]. In the case of the one-bit trigger generator 400, C[0]=1, so in that case thresh [0]=P[S [0]].

The method 1000 determines whether the number of clock cycles that have elapsed since the last reset of the trigger generator 204a is at least equal to thresh[0] (step 1008). If the method 1000 determines that at least thresh[0] clock cycles have elapsed since the last reset of the trigger generator 204a, the method 1000 asserts the first timeout event trigger signal (step 1010); otherwise, the method 1000 deasserts the first timeout event trigger signal (step 1012). The method 1000 waits one clock cycle and returns to step 1008 to repeat the monitoring process described above.

In the case of the one-bit trigger generator 400 (in which C[0]=1), steps 1008-1012 are implemented by the one-bit counter 404 and the AND gate 406. In particular, the N-bit overflow generator (FIG. 3) asserts the overflow signal that is propagated to the output 414 of the multiplexer 402 every P[S[0]] clock cycles. As described above, by ensuring that at least P[S[0]](C[0]+1) clock cycles have elapsed since reset of the counter 404 before asserting timeout trigger line 218a, the one-bit counter 404 and AND gate 406 ensure that at least thresh[0]=P[S[0]]C[0] clock cycles have elapsed since the trigger generator 400 was last reset.

In the case of the multi-bit trigger generator 500, steps 1008-1012 are implemented by the combination of the n-bit counter 504, n-bit comparator 528, and AND gate 506. In particular, the output of the n-bit counter 504 is incremented each time the overflow signal on output 514 is asserted. P[S[0]] clock cycles elapse between each assertion of the overflow signal on output 514. The first assertion of the overflow signal on output 514 may, however, occur at any time between 0 and P[S[0]]−1 clock cycles after the counter 504 has been reset, due to the fact that the free-running counter 302 asserts the selected overflow signal O[S[0]] independently of the times at which the counter 504 is reset.

The output of the counter 504 will reach the value of C[0] only after the overflow selection multiplexer output 514 has been asserted C[0] times. Because the delay between assertions of the overflow multiplexer output 514 is equal to P[S[0]], the output of the n-bit counter 504 will be equal to C[0] only after P[S[0]](C[0]−1) clock cycles have occurred since the first assertion of the output 514 after the counter 504 was last reset. Since the first assertion of the output 514 may occur between 0 and P[S[0]]−1 clock cycles after the counter 504 has been reset, the output of the n-bit counter 504 will be equal to C[0] after between P[S[0]](C[0]−1) and P[S[0]]C[0] clock cycles have elapsed since the counter 504 has been reset. The multiplexer 514 will next assert its output after an additional P[S[0]] clock cycles, for a total of between P[S[0]]C[0] and P[S[0]](C[0]+1) clock cycles between reset of the counter 504 and the time at which both inputs to the AND gate 506 are asserted. Trigger generator 500 thereby guarantees that at least thresh[0]=P[S[0]]C[0] clock cycles have elapsed after reset of the trigger generator 500 before asserting the timeout output 218a, and thereby implements steps 1008-1012.

Among the advantages of the invention are one or more of the following.

Figure 1:
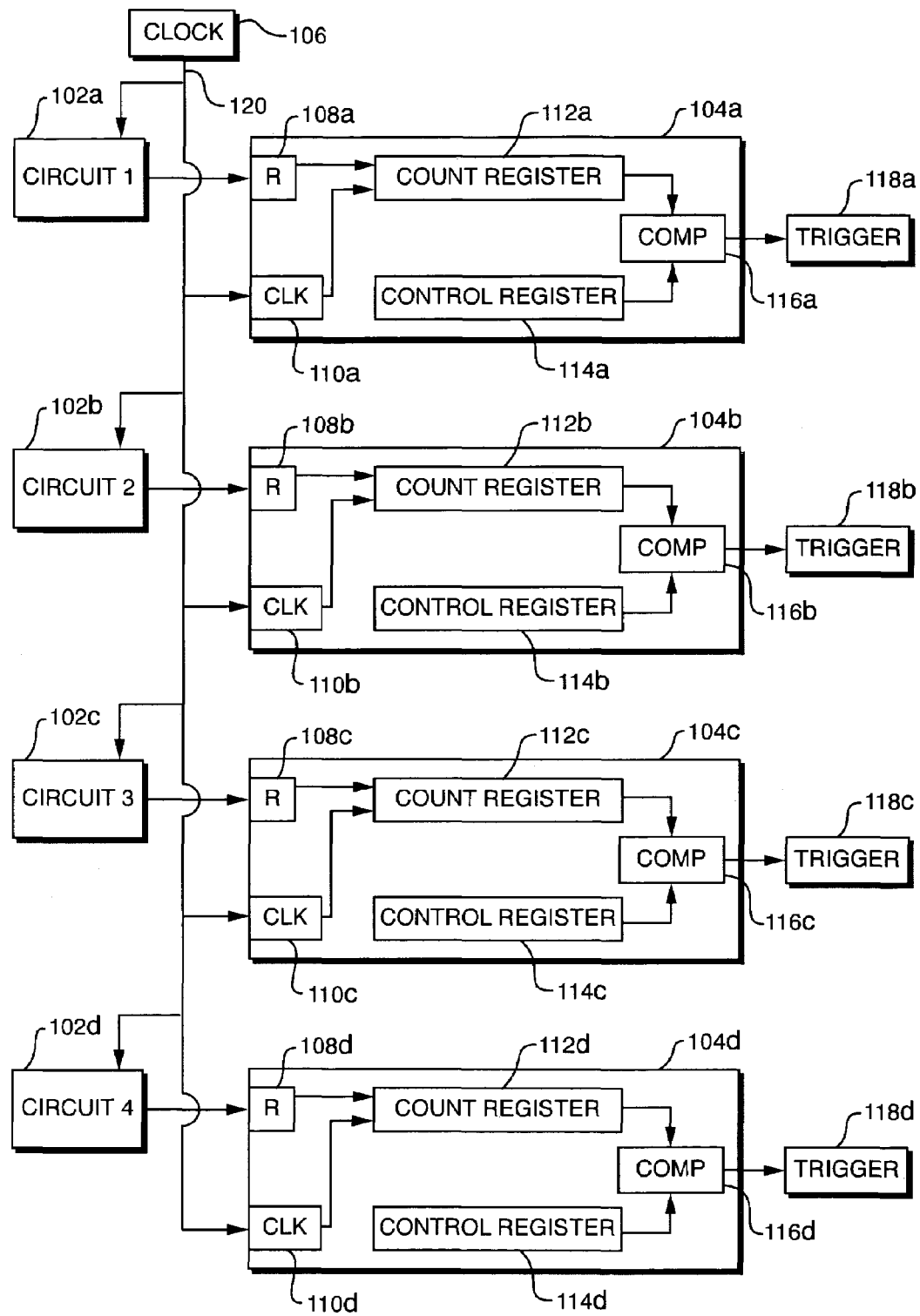
FIG. 1 is a schematic diagram of a prior art system including a plurality of circuits coupled to a plurality of watchdog timers for generating a plurality of timeout event trigger signals.

One advantage of embodiments of the present invention is that they provide a means for generating timeout trigger events using a combination of a small number of timeout counter bits and a small number of programmable control bits per timeout event in comparison with prior art systems, such as the system 100 illustrated in FIG. 1. In a system with many distinct timeout events to be triggered, application of the techniques disclosed herein may save significant logic resources. For example, a prior art system (such as the system 100 illustrated in FIG. 1) with six timeout events requiring the ability to count up to 32K clock cycles before trigger generation could require six separate 15-bit counters with six associated comparators (up to 15 bits each) as well as six control registers (up to 15 bits long) to program the desired interval for each timeout event.

This amount of hardware would provide a timeout range of 0-32K clock cycles with a resolution of one clock cycle and 0% uncertainty for each event, where uncertainty is defined as 1/(C+1). This type of implementation would result in a total of 90 counter bits, 90 bits of comparators and 90 control register bits. Using techniques disclosed herein, by contrast, a consolidated trigger generation circuit such as circuit 200, with a 12-bit overflow generator 220 with four overflow outputs and six 3-bit trigger generators would significantly reduce the logic requirements. In particular, such a system would have a programmable threshold value range of 512-32K clock cycles, a maximum resolution (minimum threshold value) of 512 clock cycles, a minimum uncertainty of 12.5%, five ($\log_2$ 32K) control register bits per event, a total of 30 counter bits, 30 control register bits, 18 comparator bits, and six overflow signal selection multiplexers. These particular parameters are provided as examples and do not constitute limitations of the present invention. Those having ordinary skill in the art will appreciate how to select and apply other parameters to achieve different results.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although the circuits 400 (FIG. 4) and 500 (FIG. 5) are described as implementations of the trigger generator 204a, the same circuitry may be used to implement the other trigger generators 204b-t. Although the trigger generators 400 and 500 illustrated in FIGS. 4 and 5, respectively, have latched output, the latches 408 and 508 are optional.

Although the selection signals described above are two-bit signals, the selection signals may have any number of bits sufficient to select from among the overflow signals generated by the overflow generator 220. For example, in the implementation shown in FIG. 3, the number of overflow signals generated by the overflow generator is equal to A, in which case each selection signal may include at least $\log_2$ A bits.

Although in the examples described above, all of the trigger generators 204a-t are n-bit trigger generators, it is not a requirement of the present invention that all of the trigger generators 204a-t have the same number of bits. Rather, more generally, the counter (e.g., the counter 504 in FIG. 5) in each of the trigger generators 204a-t may have a number of bits that is independent of the number of bits in any of the other trigger generator counters.

Although particular examples of the circuits 202a-d are described above, circuits 202a-d may be any combination of circuits. Circuits 202a-d may, for example, be subcomponents of a single circuit, multiple circuits connected over a network, or any combination thereof.

What is claimed is:

1. A device comprising:
  an overflow generator to generate a plurality of overflow signals having a plurality of periods;
  a plurality of control registers storing a plurality of selection values; and
  a first trigger generator comprising first trigger generation means for generating a first timeout event trigger signal based on the plurality of overflow signals and a first one of the plurality of selection values.

2. The device of claim 1, wherein the plurality of control registers further stores a plurality of control values, and wherein the first trigger generation means comprises means for generating the first timeout event trigger signal based on the plurality of overflow signals, the first one of the plurality of selection values, and a first one of the plurality of control values.

3. The device of claim 1, further comprising:
  a second trigger generator comprising second trigger generation means for generating a second timeout event trigger signal based on the plurality of overflow signals and a second one of the plurality of selection values.

4. The device of claim 3, wherein the plurality of control registers further stores a plurality of control values, and wherein the second trigger generation means comprises means for generating the second timeout event trigger signal based on the plurality of overflow signals, the second one of the plurality of selection values, and a second one of the plurality of control values.

5. The device of claim 1, wherein the first trigger generation means comprises:
- means for identifying a first one of the plurality of overflow signals based on the first one of the plurality of selection signals;
- means for identifying a period of the first one of the plurality of overflow signals; and
- means for generating the first timeout event trigger signal based on the period of the first one of the plurality of overflow signals.

6. The device of claim 1, wherein the means for generating the first timeout event trigger signal based on the period of the first one of the plurality of overflow signals comprises means for asserting the first timeout event trigger signal if the period of the first one of the plurality of overflow signals has elapsed since the first trigger generator was last reset.

7. The device of claim 1, wherein the plurality of control registers further stores a plurality of control values, and wherein the first trigger generation means comprises:
- means for identifying a first one of the plurality of overflow signals based on the first one of the plurality of selection signals; and
- means for generating the first timeout event trigger signal based on the first one of the plurality of overflow signals and a first one of the plurality of control signals.

8. The device of claim 7, wherein C is the first one of the plurality of control values, and wherein the means for generating the first timeout event trigger signal based on the first one of the plurality of overflow signals and a first one of the plurality of control signals comprises:
- means for asserting the first timeout event trigger signal if the first one of the plurality of overflow signals has been asserted at least C+1 times since a first predetermined reset event; and
- means for deasserting the first timeout event trigger signal otherwise.

9. The device of claim 7, wherein C is the first one of the plurality of control values, wherein P is the period of the first one of the plurality of overflow signals, and wherein the means for generating the first timeout event trigger signal based on the first one of the plurality of overflow signals and a first one of the plurality of control signals comprises:
- means for asserting the first timeout event trigger signal if an amount of time at least equal to PC has elapsed since a predetermined reset event; and
- means for deasserting the first timeout event trigger signal otherwise.

10. A device comprising:
- an overflow generator to generate a plurality of overflow signals having a plurality of periods;
- a plurality of control registers storing a plurality of selection values and a plurality of control values;
- a first trigger generator comprising first trigger generation means for generating a first timeout event trigger signal based on the plurality of overflow signals, a first one of the plurality of selection values, and a first one of the plurality of control values; and
- a second trigger generator comprising second trigger generation means for generating a second timeout event trigger signal based on the plurality of overflow signals, a second one of the plurality of selection values, and a second one of the plurality of control values.

11. A method comprising steps of:
(A) generating a plurality of overflow signals having a plurality of periods;
(B) generating plurality of selection values; and
(C) generating a first timeout event trigger signal based on the plurality of overflow signals and a first one of the plurality of selection values.

12. The method of claim 11, further comprising a step of:
(D) generating a plurality of control values; and
wherein the step (C) comprises a step of generating the first timeout event trigger signal based on the plurality of overflow signals, the first one of the plurality of selection values, and a first one of the plurality of control values.

13. The method of claim 11, further comprising a step of:
(D) generating a second timeout event trigger signal based on the plurality of overflow signals and a second one of the plurality of selection values.

14. The method of claim 13, further comprising a step of:
(E) generating a plurality of control values; and
wherein the step (D) comprises a step of generating the second timeout event trigger signal based on the plurality of overflow signals, the second one of the plurality of selection values, and a second one of the plurality of control values.

15. The method of claim 11, wherein the step (C) comprises steps of:
(C)(1) identifying a first one of the plurality of overflow signals based on the first one of the plurality of selection signals;
(C)(2) identifying a period of the first one of the plurality of overflow signals; and
(C)(3) generating the first timeout event trigger signal based on the period of the first one of the plurality of overflow signals.

16. The method of claim 15, wherein the step (C) (3) comprises a step of asserting the first timeout event trigger signal if the period of the first one of the plurality of overflow signals has elapsed since a first predetermined reset event.

17. The method of claim 11, further comprising a step of:
(D) generating a plurality of control values; and
wherein the step (C) comprises steps of:
(C) (1) identifying a first one of the plurality of overflow signals based on the first one of the plurality of selection signals; and
(C) (2) generating the first timeout event trigger signal based on the first one of the plurality of overflow signals and a first one of the plurality of control signals.

18. The method of claim 17, wherein the first one of plurality of control signals represents a value C, and wherein the step (C) (2) comprises steps of:
(C) (2) (1) asserting the first timeout event trigger signal if the first one of the plurality of overflow signals has been asserted at least (C+1) times since a first predetermined reset event; and
(C) (2) (2) deasserting the first timeout event trigger signal otherwise.

19. The method of claim 17, wherein the first one of the plurality of control signals represents a value C, wherein P is the period of the first one of the plurality of overflow signals, and wherein the step (C) (2) comprises steps of:
(C) (2) (1) asserting the first timeout event trigger signal if an amount of time at least equal to PC has elapsed since a predetermined reset event; and
(C) (2) (2) deasserting the first timeout event trigger signal otherwise.

20. A method comprising steps of:
(A) generating a plurality of overflow signals having a plurality of periods;
(B) generating plurality of selection values;

(C) generating a plurality of control values;
(D) generating a first timeout event trigger signal based on the plurality of overflow signals, a first one of the plurality of selection values, and a first one of the plurality of control values; and
(E) generating a second timeout event trigger signal based on the plurality of overflow signals, a second one of the plurality of selection values, and a second one of the plurality of control values.

21. A device comprising:
a multiplexer comprising a plurality of data inputs to receive a plurality of overflow signals, a selection input to receive a selection signal, and an output to provide one of the plurality of overflow signals selected by the selection signal;
a one-bit counter comprising a data input coupled to the output of the multiplexer, a reset input, and a data output to provide a one-bit count signal; and
an AND gate having a first input coupled to the data output of the one-bit counter, a second input coupled to the output of the multiplexer, and an output to provide a first timeout event trigger signal.

22. The device of claim 21, further comprising:
a latch comprising a data input coupled to the output of the AND gate, and an output to provide a second timeout event trigger signal.

23. A device comprising:
selection means comprising means for receiving a plurality of overflow signals, means for receiving a selection signal, means for selecting one of the plurality of overflow signals based on the selection signal, and means for providing as output the selected one of the plurality of overflow signals;
counting means for counting the number of times the selected one of the plurality of overflow signals has been asserted since a predetermined reset event; and
timeout event trigger signal generation means for asserting a timeout event trigger signal when the selected one of the plurality of overflow signals has been asserted twice since the predetermined reset event.

24. The device of claim 23, further comprising:
a latch comprising means for receiving a clock signal, means for receiving the first timeout event trigger signal, and means for providing the timeout event trigger signal as output in response to a transition in the clock signal.

25. A device comprising:
a multiplexer comprising a plurality of data inputs to receive a plurality of overflow signals, a selection input to receive a selection signal, and an output to provide one of the plurality of overflow signals selected by the selection signal;
a multi-bit counter comprising a data input coupled to the output of the multiplexer, a reset input, and a plurality of data outputs to provide a multi-bit count signal;
a multi-bit comparator a first plurality of inputs coupled to the plurality of data outputs of the multi-bit counter, a second plurality of inputs to receive a multi-bit control signal, and a data output to provide a comparison signal indicating whether the multi-bit count signal is equal to the multi-bit control signal; and
an AND gate having a first input coupled to the data output of the multi-bit comparator, a second input coupled to the output of the multiplexer, and an output to provide a first timeout event trigger signal.

26. The device of claim 25, further comprising:
a latch comprising a data input coupled to the output of the AND gate, and an output to provide a second timeout event trigger signal.

27. A device comprising:
selection means comprising means for receiving a plurality of overflow signals, means for receiving a selection signal, means for selecting one of the plurality of overflow signals based on the selection signal, and means for providing as output the selected one of the plurality of overflow signals;
counting means for counting the number of times the selected one of the plurality of overflow signals has been asserted since a predetermined reset event;
comparison means for generating a comparison signal indicating whether a predetermined control value is at least equal to the number of times the selected one of the plurality of overflow signals has been asserted since a predetermined reset event; and
timeout event trigger signal generation means for asserting a timeout event trigger signal when the predetermined control value is at least equal to the number of times the selected one of the plurality of overflow signals has been asserted since a predetermined reset event.

28. The device of claim 27, further comprising:
a latch comprising means for receiving a clock signal, means for receiving the first timeout event trigger signal, and means for providing the timeout event trigger signal as output in response to a transition in the clock signal.

29. A method comprising steps of:
(A) receiving a plurality of overflow signals having a plurality of periods;
(B) receiving a first selection signal;
(C) identifying a first one of the plurality of overflow signals based on the first selection signal; and
(D) generating a first trigger signal based on the identified one of the plurality of overflow signals.

30. The method of claim 29, wherein the step (D) comprises a step of asserting the first timeout event trigger signal if an amount of time at least equal to the period of the first one of the plurality of overflow signals has elapsed since a first predetermined reset event.

31. The method of claim 29, further comprising a step of:
(E) receiving a first control signal; and
wherein the step (D) comprises a step of generating the first trigger signal based on the first control signal and the identified one of the plurality of overflow signals.

32. The method of claim 31, wherein the first one of the plurality of control signals represents a value C, and wherein the step (D) comprises steps of:
(D) (1) asserting the first timeout event trigger signal if the first one of the plurality of overflow signals has been asserted at least C+1 times since a first predetermined reset event; and
(D) (2) deasserting the first timeout event trigger signal otherwise.

33. The method of claim 31, wherein the first one of the plurality of control signals represents a value C, wherein P is the period of the first one of the plurality of overflow signals, and wherein the step (D) comprises steps of:
(D) (1) asserting the first timeout event trigger signal if an amount of time at least equal to PC has elapsed since a predetermined reset event; and
(D) (2) deasserting the first timeout event trigger signal otherwise.

* * * * *

UNITED STATES PATENT AND TRADEMARK OFFICE
CERTIFICATE OF CORRECTION

PATENT NO. : 7,310,751 B2  Page 1 of 1
APPLICATION NO. : 10/783112
DATED : December 18, 2007
INVENTOR(S) : Michael Tayler et al.

It is certified that error appears in the above-identified patent and that said Letters Patent is hereby corrected as shown below:

In column 4, line 51, delete "0[2]" and insert -- O[2] --, therefor.

In column 4, line 52, delete "0[3]" and insert -- O[3] --, therefor.

In column 9, line 62, delete "O[S[O]]" and insert -- O[S[0]] --, therefor.

In column 10, line 35, delete "P[S[O]]" and insert -- P[S[0]] --, therefor.

In column 15, line 57, in Claim 25, after "comparator" insert -- having --.

Signed and Sealed this

Twenty-seventh Day of May, 2008

JON W. DUDAS
*Director of the United States Patent and Trademark Office*